United States Patent
Lindoff (10) Patent No.: US 8,149,968 B2
(45) Date of Patent: Apr. 3, 2012

(54) ESTIMATING A SIGNAL-TO-INTERFERENCE RATIO IN A RECEIVER OF A WIRELESS COMMUNICATIONS SYSTEM

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 93 days.

(21) Appl. No.: 12/675,395

(22) PCT Filed: Aug. 19, 2008

(86) PCT No.: PCT/EP2008/060816
§ 371 (c)(1),
(2), (4) Date: Jul. 10, 2010

(87) PCT Pub. No.: WO2009/027261
PCT Pub. Date: Mar. 5, 2009

(65) Prior Publication Data
US 2010/0284499 A1    Nov. 11, 2010

Related U.S. Application Data

(60) Provisional application No. 60/969,170, filed on Aug. 31, 2007.

(30) Foreign Application Priority Data

Aug. 30, 2007    (EP) .................................. 07388062

(51) Int. Cl.
| | |
|---|---|
| H03K 5/01 | (2006.01) |
| H03K 6/04 | (2006.01) |
| H04L 1/00 | (2006.01) |
| H03D 1/04 | (2006.01) |
| H03D 1/06 | (2006.01) |
| H04B 1/10 | (2006.01) |

(52) U.S. Cl. ........ 375/346; 375/316; 375/324; 375/340; 375/348

(58) Field of Classification Search .................. 375/340, 375/346, 348, 316, 324
See application file for complete search history.

(56) References Cited

U.S. PATENT DOCUMENTS

| 7,573,694 B2* | 8/2009 | Morikawa ...................... 361/160 |
| 2003/0125040 A1* | 7/2003 | Walton et al. ................. 455/454 |
| 2006/0008037 A1 | 1/2006 | Chang et al. |
| 2006/0262841 A1 | 11/2006 | Vaisanen et al. |

FOREIGN PATENT DOCUMENTS

| EP | 1 367 752 A1 | 12/2003 |
| EP | 1 499 059 A1 | 1/2005 |

OTHER PUBLICATIONS

International Preliminary Report on Patentability, dated Mar. 11, 2010, in connection with International Application No. PCT/EP2008/060816.

(Continued)

*Primary Examiner* — Ted Wang
(74) *Attorney, Agent, or Firm* — Potomac Patent Group PLLC (57) ABSTRACT

A Signal-to-Interference Ratio of a radio channel is estimated in a receiver of a wireless communications system, wherein pilots with reference information are modulated on some sub-carriers in some symbols. At least one parameter for signals received from said first transmitter is detected, and a number ($N_f$, $N_t$) of pilots in first groups that can be coherently combined in a second group is determined, and from these a channel estimate (H) for each first group and a first covariance estimate (R) for each second group are determined. A number (M) of first covariance estimates that can be averaged is defined in dependence of the presence of signals from possible interfering transmitters, and a second covariance estimate is determined as an average of said number of first covariance estimates. From the channel estimates and the second covariance estimate a Signal-to-Interference Ratio for each second group is estimated.

21 Claims, 4 Drawing Sheets

OTHER PUBLICATIONS

PCT International Search Report, dated Mar. 17, 2009, in connection with International Application No. PCT/EP2008/060816.
Muneta, S. et al. "A new frequency-domain link adaptation scheme for broadband OFDM systems" Vehicular Technology Conference, 1999. VTC 1999—Fall. IEEE VTS 50th Amsterdam, Netherlands Sep. 19-22, 1999, Piscataway, NJ, USA, IEEE, US, vol. 1, Sep. 19, 1999, pp. 253-257, XP010352833, ISBN: 0-7803-5435-4.

* cited by examiner

ESTIMATING A SIGNAL-TO-INTERFERENCE RATIO IN A RECEIVER OF A WIRELESS COMMUNICATIONS SYSTEM

CROSS-REFERENCE TO RELATED APPLICATIONS

This application claims priority under 35 U.S.C. §119 to European Patent Application No. 07388062.7, filed Aug. 30, 2007, which is hereby incorporated herein by reference in its entirety. This application also claims the benefit of U.S. Provisional Application No. 60/969,170, filed Aug. 31, 2007, which is hereby incorporated herein by reference in its entirety.

TECHNICAL FIELD OF THE INVENTION

The invention relates to a method of estimating, in a receiver of a wireless communications system, a Signal-to-Interference Ratio of a radio channel from a transmitter to the receiver.

DESCRIPTION OF RELATED ART

In the forthcoming evolution of the mobile cellular standards like Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from existing cellular systems to the new high capacity high data rate system in existing radio spectrum, the new system has to be able to operate in a flexible bandwidth. A proposal for such a new flexible cellular system is Third Generation (3G) Long Term Evolution (3G LTE) that can be seen as an evolution of the 3G WCDMA standard. This system will use OFDM as multiple access technique (called OFDMA) in the downlink and will be able to operate on bandwidths ranging from 1.25 MHz to 20 MHz. Furthermore, data rates up to 100 Mb/s will be supported for the largest bandwidth.

However, not only high rate services are expected to use 3G LTE, but also low rate services like voice. Since 3G LTE is designed for the Transmission Control Protocol/Internet Protocol (TCP/IP), Voice over Internet Protocol (VoIP) will be the service carrying speech.

There are several reasons why OFDM has been chosen for LTE. One reason is that the receiver complexity can be made relatively low. Another reason is that, at least in theory, OFDM allows for very efficient usage of the available bandwidth.

In case only one user is transmitting, the quality of the channel from the transmitter to the receiver is typically very different at different frequencies or, in other words, the channel is said to be frequency selective. Since the information in OFDM is transmitted on a large number of sub-carriers, different modulation and coding can be applied on different sub-carriers, or groups of sub-carriers, rather than using the same modulation and coding on all sub-carriers. In 3G LTE, one such group of sub-carriers is a group referred to as a resource block, which corresponds to data being sent using a certain number of sub-carriers during a certain time. Normally, a resource block in 3G LTE consists of 12 sub-carriers and seven OFDM symbols. To apply different modulation and coding on different resource blocks, the quality for the different resource blocks of the channel, e.g. the signal-to-noise ratio or the signal-to-interference ratio (SIR), must be estimated, and these estimates must be fed back to the transmitter. The different modulation and coding on different resource blocks allow the transmission of more information on resource blocks having a higher quality than on those with a lower quality.

When several users are sharing the available bandwidth, as it is normally the case in 3G LTE (orthogonal frequency division multiple access—OFDMA), the sharing of the channel is done by allocating different resource blocks to different users. For a cellular system with one base station and several mobile stations, the channels from the base stations to the different mobile stations vary differently and typically independently of one another. The idea of transmitting more information on the resource blocks that have good quality, as described above, can in this case be generalized in the following way. The quality on all resource blocks for all users is determined. The base-station can then decide, not only what is the optimum modulation and coding, but also which one of the users should be allocated what resource blocks.

Although the potential gain is considerable using adaptive modulation and coding, it is not so easily obtained in practice. First, in order to estimate the channel quality, dedicated symbols must be transmitted. Henceforth, these symbols are referred to as channel quality information (CQI) pilots. The cost of transmitting CQI pilots is two-fold. First, part or the transmitted power is used for transmitting pilots rather than actual data. Second, the effective used data rate that can be supported is reduced, since some of the symbols are not carrying any user data.

One reason why the potential gain is not obtained is that the channel cannot be made known to the transmitting side. One reason for this is that the channel is time-varying. This means that even if the channel could be estimated perfectly at the receiver side, the channel might well have changed when that information becomes available at the transmitter side.

The estimation itself is also a non-trivial task. Due to the frequency selectivity and time-varying channel snap shot SIRs (momentary SIR values) are hard to do in an accurate way, which gives rise to biased and noisy SIR-estimates. This in turn makes the scheduler take wrong decisions in the choice of modulation and coding and resource block allocation, thus reducing the system capacity as well as the user throughput.

Generally, to avoid biased and noisy SIR-estimates, coherent accumulation should be done over as many pilots as possible. Although this can be done for good channels, a worst case channel scenario, i.e. high Doppler, bad timing information and a heavily frequency selective channel, implies very few pilots to do coherent accumulation over, which increases the bias in the estimate, since a limitation of the number of pilots used for SIR estimation reduces the accuracy of the SIR estimate.

US 2006/0262841 describes a communications system employing frame-structured data transfer with a number of time slots in a frame and a number of pilot symbols in a frame, such as a UMTS system, other CDMA systems, a WLAN system or a GSM system, i.e. a system that does not transmit on a number of sub-carriers. It is disclosed that the number of pilot symbols included from each time interval in the SIR estimation may be determined according to a determined criterion or criteria, such as the relative speed between a subscriber unit and a serving base station. Since this system does not transmit on different sub-carriers it does not relate to the problem of frequency selectivity.

Hence, there is a need for method and apparatus for improved SIR estimation methods capable of adapting the estimation parameters to the radio environments.

SUMMARY

Therefore, it is an object of the invention to provide a method of estimating the Signal-to-Interference Ratio of a radio channel from a transmitter to a receiver, which achieves an optimized estimating performance regardless of the channel scenario and which thus improves the throughput and capacity of the system.

According to the invention the object is achieved in a method of estimating, in a receiver of a wireless communications system, a Signal-to-Interference Ratio of a radio channel from a first transmitter to the receiver, wherein signals comprising symbols of a given duration are transmitted over said radio channel on a number of sub-carrier frequencies; and wherein pilots with reference information whose transmitted value is known to the receiver are modulated on some of said sub-carrier frequencies in some symbols. The object is achieved in that the method comprises the steps of detecting for received pilots at least one parameter for signals received from said first transmitter; defining, in dependence of said at least one parameter, first groups of pilots that can be used for coherent combining; determining a number of pilots in each of said first groups and a number of such first groups that can be used for non-coherent combining in a second group; determining a channel estimate for each of said first groups of pilots from the received pilots in that group and the determined number of pilots in that group; determining a first covariance matrix estimate for each of said second groups from the received pilots in that group, the determined channel estimate for each first group in that second group, the determined number of pilots in each first group in that second group, and the determined number of first groups in that second group; defining in dependence of the presence of signals received from possible interfering transmitters a number of first covariance matrix estimates that can be averaged; determining a second covariance matrix estimate as an average of said number of first covariance matrix estimates; and determining from said channel estimates and said second covariance matrix estimate a Signal-to-Interference Ratio estimate for each of said second groups.

When the number of pilots (in time and frequency) used for coherently and non-coherently estimating the S and I parts of the SIR is adapted to parameters for signals received from the serving transmitter, and the determined SIR estimates are further averaged over a number of pilots that is determined in dependence of signals received from interfering transmitters, optimized SIR estimating performance is achieved regardless of scenario and hence improved throughput and capacity in the system are achieved.

The step of detecting the at least one parameter may comprise detecting at least one of Doppler, time delay spread and timing accuracy for the signals received from said first transmitter. These parameters typically affect the signal part of the signal-to-interference ratio. The Doppler is a result of the movement of the receiver relative to the transmitter and thus indicative of the time variation of the channel, while the time delay spread and timing accuracy similarly indicate the frequency selectivity of the channel. Therefore these parameters allow the number of pilots used for the estimation to be adapted to the time variation as well as the frequency selectivity of the channel.

When the step of defining the number of first covariance matrix estimates that can be averaged comprises detecting a number of interfering transmitters and at least one of time delay spread and timing accuracy for signals received from such interfering transmitters, it is also possible to adapt the estimation to the interference scenario, since the time delay spread and timing accuracy for signals received from the interfering transmitters are indicative of the interference.

In one embodiment, the step of determining a Signal-to-Interference Ratio estimate for each of said second groups comprises the steps of determining a temporary Signal-to-Interference Ratio estimate for each first group of pilots in that second group from the determined channel estimate for that first group in the second group and the determined second covariance matrix estimate; and determining the Signal-to-Interference Ratio estimate for that second group as an average of said temporary Signal-to-Interference Ratio estimates determined for first groups in that second group.

When the method further comprises the step of determining a bias-compensated Signal-to-Interference Ratio estimate by multiplying the Signal-to-Interference Ratio estimate determined for each of said second groups by a compensation factor, a simple way of achieving bias compensation is achieved. Especially when the estimation is based on few pilots, a bias compensation might be needed.

In one embodiment, the method is performed in a receiver of an Orthogonal Frequency Division Multiplexing system, which may be a Third Generation Long Term Evolution system. In the latter case, the second group may be a resource block in the Third Generation Long Term Evolution system.

Alternatively, the method may be performed in a receiver of a Wimax system.

The method may further comprise the step of transmitting said determined Signal-to-Interference Ratio estimate as channel quality information to said first transmitter. This allows the transmitter to use the information to adapt the modulation and coding of the transmitted data.

As mentioned, the invention also relates to a receiver of a wireless communications system, wherein signals comprising symbols of a given duration are transmitted over a radio channel from a first transmitter to the receiver on a number of sub-carrier frequencies; and wherein pilots with reference information whose transmitted value is known to the receiver are modulated on some of said sub-carrier frequencies in some symbols, the receiver being arranged to estimate a Signal-to-Interference Ratio of said radio channel. When the receiver comprises means for detecting for received pilots at least one parameter for signals received from said first transmitter; means for defining, in dependence of said at least one parameter, first groups of pilots that can be used for coherent combining, and for determining a number of pilots in each of said first groups and a number of such first groups that can be used for non-coherent combining in a second group; means for determining a channel estimate for each of said first groups of pilots from the received pilots in that group and the determined number of pilots in that group, and for determining a first covariance matrix estimate for each of said second groups from the received pilots in that group, the determined channel estimate for each first group in that second group, the determined number of pilots in each first group in that second group, and the determined number of first groups in that second group; means for defining in dependence of the presence of signals received from possible interfering transmitters a number of first covariance matrix estimates that can be averaged; and means for determining a second covariance matrix estimate as an average of said number of first covariance matrix estimates, and for determining from said channel estimates and said second covariance matrix estimate a Signal-to-Interference Ratio estimate for each of said second groups, an optimized SIR estimating performance is achieved regardless of scenario and hence improved throughput and capacity in the system are achieved.

Embodiments corresponding to those mentioned above for the method also apply for the receiver.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

In Orthogonal Frequency Division Multiplexing (OFDM) systems a multi carrier approach, in which an original data stream to be transmitted from a transmitter to a receiver is multiplexed into a number of parallel data streams with a correspondingly low symbol rate, is used to reduce inter symbol interference (ISI) by reducing the symbol rate without reducing the data rate. The inter symbol interference is caused by delay spread of the channel impulse response for the multipath channel over which the signals are transmitted. Each of the parallel data streams is modulated with a different sub-carrier frequency and the resulting signals are transmitted together in the same band from a transmitter to a receiver. Typically, a high number of different sub-carrier frequencies, i.e. several hundreds or even thousands, will be used, and these frequencies will be very close to each other. In the receiver a Fast Fourier Transform (FFT) is used for separating the parallel data streams and recovering the original data stream.

3G Long Term Evolution (3G LTE) is a proposal for a new flexible mobile cellular system using OFDM as multiple access technique in the downlink. The description below uses 3G LTE as an example, but it is noted that other systems transmitting parallel data streams on corresponding sub-carriers can be used as well.

In case only one user is transmitting, the quality of the channel from the transmitter to the receiver is typically very different at different frequencies or, in other words, the channel is said to be frequency selective. Since the information in OFDM is transmitted on a large number of sub-carriers, different modulation and coding can be applied on different sub-carriers, or groups of sub-carriers, rather than using the same modulation and coding on all subcarriers. In 3G LTE, one such group of sub-carriers is a group referred to as a resource block, which corresponds to data being sent using a certain number of sub-carriers during a certain time. Normally, a resource block in 3G LTE consists of 12 sub-carriers and seven OFDM symbols. To apply different modulation and coding on different resource blocks, the quality of the different resource blocks of the channel, e.g. the signal-to-noise ratio or the signal-to-interference ratio (SIR), must be estimated, and these estimates must be fed back to the transmitter. The different modulation and coding on different resource blocks allow the transmission of more information on resource blocks having a higher quality than on those with a lower quality.

When several users are sharing the available bandwidth, as it is normally the case in 3G LTE, the sharing of the channel is done by allocating different resource blocks to different users. For a cellular system with one base station and several mobile stations, the channels from the base stations to the different mobile stations vary differently and typically independently of one another. The idea of transmitting more information on the resource blocks that have good quality, as described above, can in this case be generalized in the following way. The quality on all resource blocks for all users is determined. The base-station can then decide, not only what is the optimum modulation and coding, but also which one of the users should be allocated what resource blocks.

Figure 1:
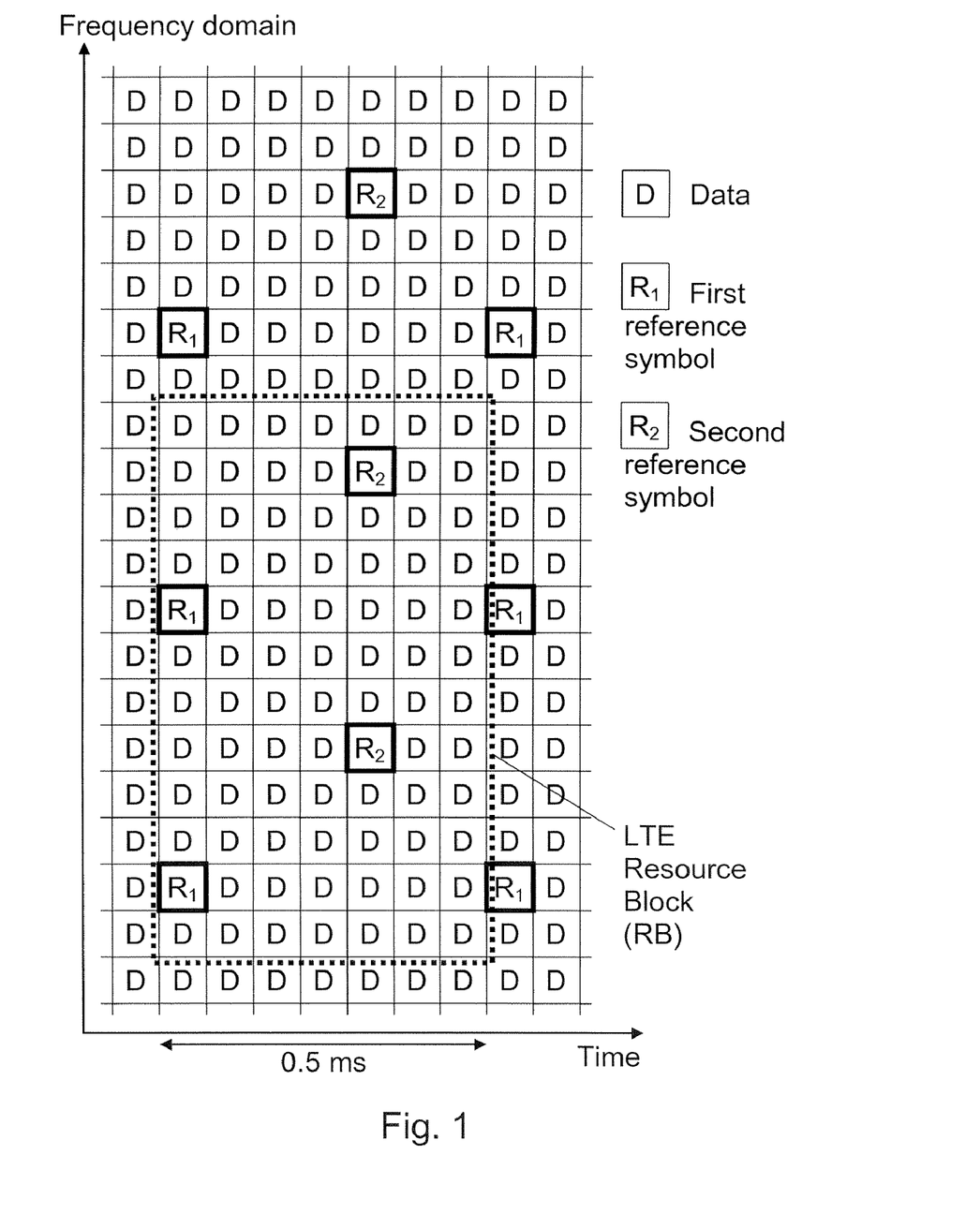
FIG. 1 shows a pilot pattern for a 3G LTE system.

In order to estimate the channel quality, dedicated symbols are transmitted. These symbols are referred to as channel quality information (CQI) pilots. Pilot cells or pilot symbols are cells or symbols distributed in time and frequency within the OFDM frame structure that are modulated with reference information, whose transmitted value is known to the receiver. In FIG. 1, the pilot pattern proposed for 3G LTE is shown. As can be seen the pilot symbols are transmitted every 6th sub-carrier in the first and fifth OFDM symbol of a resource block or sub frame. In the fifth OFDM symbol, the pilot symbols are shifted by 3 sub-carriers relative the pilots in the first symbol.

Thus based on these pilot symbols each user can estimate the channel quality (e.g. the SIR) for the different resource blocks. However, this is not a trivial task. In addition to being frequency selective, the channel is also time-varying. This means that even if the channel could be estimated perfectly at the receiver side, the channel may well have changed when that information becomes available at the transmitter side. It can be seen that for a good channel, i.e. one that varies only little with frequency as well as time, the best results are achieved when coherent accumulation is done over a relatively large number of pilot symbols in frequency as well as time within a resource block or even over several resource blocks. For a more frequency selective channel, it is, however, only possible to accumulate over pilots from a few sub-carriers because the channel varies too much from one sub-carrier to another, and similarly, for a more time-varying channel, it is only possible to accumulate over pilots from a few OFDM symbols because the channel varies too fast. Thus, if the channel is both very frequency selective and very time-varying, only very few pilots are left for coherent accumulation. Accumulation over such few pilots gives rise to biased and noisy quality estimates, but for a poor channel this must be accepted. If, however, accumulation over the few pilots that can be used for a poor channel is also used for all other channels, the result will be bad estimates, even under more favourable conditions. In the method described below, the number of pilots used for coherent and non-coherent accumulation is adapted to one or more parameters describing the quality of the channel.

Figure 2:
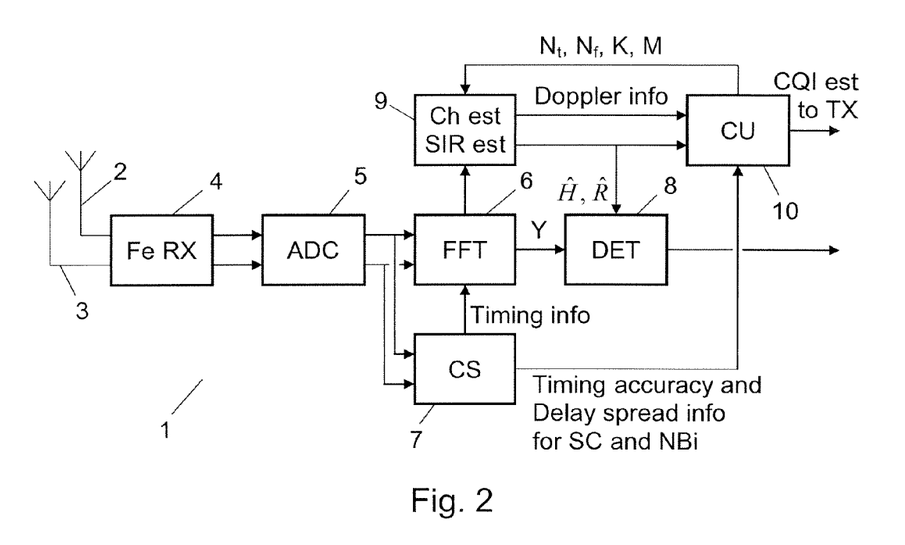
FIG. 2 shows a block diagram of a receiver circuit in which SIR estimation can be performed.

A block diagram of a receiver circuit 1 of a mobile station in which the invention can be used is shown in FIG. 2. In the Figure, the receiver 1 is shown with two receiver antennas 2, 3, but, as it will be mentioned below, the number of antennas may also be different from two. The signal is received through the antennas 2, 3 and down-converted in a front end receiver 4 and then converted to a digital base band signal in the analog-to-digital converter 5. The digital base band signal is fed to a cell search unit 7 that on regular basis performs synchronization and cell search to obtain the timing estimate of the serving cell (SC) as well as detected neighbouring cells (NBi). The serving cell is the cell transmitting data to the receiver. Also delay spread info is obtained in the cell search unit 7. The timing info is fed to the FFT 6 that performs FFT of the received base band signals to obtain the signal representation in the frequency domain. The frequency domain signal is fed to a detector 8, in which the received data symbols are detected. The frequency domain signal is also fed to the channel estimation and Signal-to-Interference Ratio (SIR) estimation unit 9 that estimates the channel and the interference, i.e. the quality of the channel. In the channel estimation unit also the Doppler spread is estimated. A control unit 10 receives the Doppler, timing and delay spread information and based on that information adapts a number of parameters $N_t$, $N_f$, K, M to be used in the channel and SIR estimation unit 9 as it will be described in further detail below. The control unit 10 also transmits channel quality information (CQI), e.g. in the form of the estimated SIR, to the base station side.

If it is assumed that the number of antennas on the receiver 1 is d, the received signal for sub-carrier j at time t after the FFT 6 can be written as $$Y_{t,j} = H_j(t)s_t^j + E_t^j, \quad (1)$$

where $H_j(t)$ is a d×1 complex-valued channel vector, $s_t^j$ the transmitted signal and $E_t^j$ is a d×1 noise and interference vector with covariance $R_j$. The covariance $R_j$ is a d×d matrix defined as $R_j = E(E_t^j(E_t^j)^H)$, i.e. the mathematical expectation labeled E(..) of $E_t^j(E_t^j)^H$, where the superscript H (Hermite) indicates the complex conjugate transpose of the corresponding vector or matrix.

The channel and interference matrix are estimated in the estimation unit 9 and fed to the detector 8, in which a matched filter is computed to form the detector statistics $$D = \hat{H}_j^H(t)\hat{R}_j^{-1}Y_{t,j}. \quad (2)$$

Ideally, if H and R are estimated correctly, the SIR in the detector is $$SIR_{ideal}^j(t) = H_j^H(t)R_j^{-1}H_j(t). \quad (3)$$

However, due to non-ideal H and R estimates, the true SIR is $$SIR_{true}^j(t) = \frac{\left(\hat{H}_j(t)^H \hat{R}_j^{-1} H_j(t)\right)^2}{\left(\hat{H}_j(t)^H \hat{R}_j^{-1} R_j \hat{R}_j^{-1} \hat{H}_j(t)\right)}. \quad (4)$$

In order to estimate the channel vector Mt) and covariance matrix $R_j$ for sub-carrier j, it is utilized that pilot symbols are transmitted on a fraction of the sub-carriers (say sub-carrier i∈I). Then based on these channel estimates, the channel estimates for j may be obtained e.g. by interpolation, although the invention is not limited to such interpolation. Furthermore, it can typically be assumed that the covariance matrix $R_j$ is constant over a number of sub-carriers, e.g. constant over one resource block equal to 12 sub-carriers in 3GPP LTE. For SIR estimation used for CQI, one SIR value can be estimated per resource block, typically as the mean SIR over the resource block, and below an example of how that can be made is described.

Figure 3:
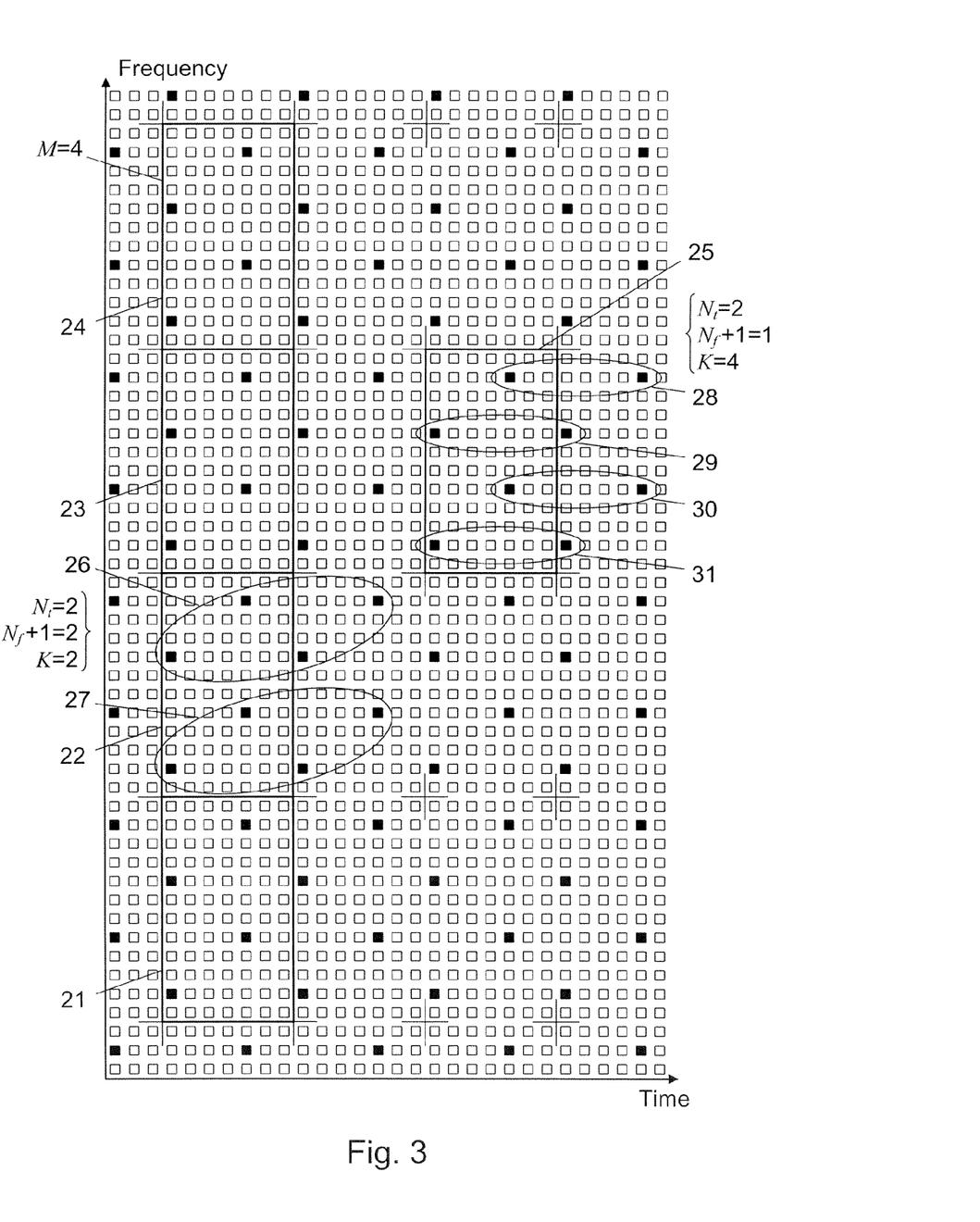
FIG. 3 illustrates groups of pilots that can be used for coherent and non-coherent accumulation.

Based on information about Doppler, channel delay spread and timing accuracy information for the serving cell, the number of pilot symbols that can co-herently be combined over in time ($N_t$) and frequency ($N_f + 1$) is determined. As examples, information about Doppler may be obtained from old channel estimates, while information about timing info and channel delay spread may be obtained for instance from the synchronization channel. Typically, $N_t$ is in the order 2-4, while $N_f$ is 0, 1 or 3, corresponding to $N_f + 1$ being 1, 2 or 4, i.e. one, two or all four pilot symbols of a resource block can be used for coherent combination. In determining $N_t$ and $N_f$, each of the three parameters (i.e. Doppler, timing info and channel delay spread) can be considered individually, or they can be combined in e.g. a table indicating proposed values of $N_t$ and $N_f$ for different combinations of the three parameters. The higher values of $N_f$ are used for channels having low delay spread and good timing accuracy, and correspondingly the higher values of $N_t$ are used for channels with low Doppler. The selection of $N_t$ and $N_f$ is illustrated in FIG. 3, which similarly to FIG. 1 shows the pilot pattern and the arrangement of resource blocks for 3G LTE. As examples, the resource block 22 is shown with $N_t$ as well as $N_f + 1$ equal to two, while the resource block 25 is shown with $N_t$ equal to two and $N_f + 1$ equal to one. In the latter case this means that a pilot can be coherently combined with one other pilot on the same sub-carrier, but not with carriers from other sub-carriers.

Having determined $N_t$ and $N_f$, the channel estimate can be made according to $$\hat{H}_i(t) = \frac{1}{N_t \cdot (N_f + 1)} \sum_{n=0}^{N_t-1} \sum_{f=i-N_f/2}^{i+N_f/2} Y_{t-n,f}. \quad (5)$$

For obtaining the R-estimate, a number K of non-coherently combined channel estimates over one resource block is first obtained. By assuming R is constant over one resource block, K can be obtained utilizing the total number of pilot sub-carriers per resource block and the number $N_f$ of sub-carriers used for coherent combining. When $N_f + 1$ pilot sub-carriers (in a group) can be used for determining a channel estimate by coherent combining, K will be the number of such groups in a resource block, which can be non-coherently combined. For 3G LTE, four sub-carriers transmit pilots in each resource block, as it is seen in FIG. 1, and hence K=4/($N_f+1$). Thus in FIG. 3, the resource block 22 has K=2 and the resource block 25 has K=4.

Secondly, the R-estimate depends on the interfering scenario, i.e. whether the interference is "AWGN like" (i.e. many equally strong neighbouring (NB) cells or no neighbouring cells at all, i.e. thermal noise limited scenarios) or is dominating by a single strong interferer. AWGN is Additive White Gaussian Noise. Such information is typically known from the detected neighbour cell list, i.e. the UE cell search and measurement unit 7 which have such information. However, the invention is not limited to obtaining the information from a cell search unit. Another solution could be to obtain the R-estimate for different resource blocks and then determine over how many resource blocks the R-estimate is approximately constant, which can be done by performing a hypothesis test.

If the interference is "AWGN like", the interference is approximately equal for all resource blocks; hence the final covariance estimate for a resource block can be obtained by averaging over a large number M of resource blocks.

If on the other hand, there is one dominant interferer, the interference for different resource blocks depends on the delay spread or the timing accuracy on the interfering cell. Large delay spread means much frequency selectivity meaning the interference varies over the resource blocks, and hence almost no (or only a few) resource blocks can be averaged over to obtain the final covariance estimate. The opposite holds for a low delay spread for the interfering channel, thus allowing for a larger value of M.

Thus roughly speaking, a smaller value of M has to be used when there is one dominant interferer with large delay spread, while larger values of M can be used when there are no interferers at all, one dominant interferer with small delay spread or when there are several interferers.

As an example, the number M can be determined from a table with pre-calculated values in dependence of the number of interfering cells and the delay spread of those cells. It can also be calculated from an algorithm in dependence of the same parameters.

FIG. 3 illustrates an example where the number M has been determined to four, so that it is possible to average over the four resource blocks 21, 22, 23 and 24.

Thus when the parameters $N_t$, $N_f$, K and M have been determined in the control unit 10 and fed to the channel and SIR estimation unit 9, the estimate of R for one resource block can be determined as $$\hat{R}_m^{tmp} = \qquad (6)$$

$$\frac{1}{K(N_t(N_f+1)-1)} \sum_{i=0}^{K} \sum_{n=0}^{N_t-1} \sum_{f=i-N_f/2}^{i+N_f/2} (Y_{t-n,f} - \hat{H}_i(t))(Y_{t-n,f} - \hat{H}_i(t))^H,$$

and when averaged over M resource blocks $$\hat{R}_{RB} = \frac{1}{M} \sum_{m=1}^{M} \hat{R}_m^{tmp}. \qquad (7)$$

When the channel estimate $\hat{H}_i(t)$ has then been found for each of the K groups of pilot symbols in a resource block, and the estimate of R has been found for that resource block (and others when M>1), a temporary SIR estimate for each of the K groups of pilot symbols in the resource block can then be determined. Then the SIR estimate for the resource block is obtained as non-coherent accumulation of the K temporary SIR estimates, i.e.

$$\tilde{SIR}_{RB}(t) = \frac{1}{K} \sum_{i=1}^{K} \hat{H}_i(t)^H \hat{R}_{RB}^{-1} \hat{H}_i(t). \qquad (8)$$

Typically the SIR estimate calculated this way will be biased, especially when only a few pilot symbols could be used for the accumulation. Therefore, a bias compensation can be done in order to get an unbiased estimate, or at least a less biased estimate. Unbiasedness, relative to the true SIR of equation (4), can be obtained by scaling with a factor f and subtracting an intercept g, where f and g are functions of $N_t$, $N_f$, K, M and the number of receive antennas d. Thus the bias-compensated SIR estimate can be written as $$\hat{SIR}_{RB}(t) = f_{M,K,N_t,N_f,d} \tilde{SIR}_{RB}(t) - g_{M,K,N_t,N_f,d}. \qquad (9)$$

The exact values of f and g depend on the distribution characteristics on the channel and covariance estimates, but in case of Gaussian random variables, explicit f and g can be calculated In a typical implementation for CQI estimation (i.e. snap shot SIR estimation), g is typically small and can be assumed to be 0; otherwise there will be a risk for negative SIR estimate, especially for low SIR values. The function f can in the Gaussian case be derived as $$f_{M,K,N_t,N_f,d} = \frac{K(N_t(N_f+1)-1)-d+1}{K(N_t(N_f+1)-1)} \cdot \frac{K(N_t(N_f+1)-1)-d}{K(N_t(N_f+1)-1)}. \qquad (10)$$

It is noted that in this Gaussian case, f does not depend on M. However, in the general case, f could also be dependent on M.

The bias corrected SIR is obtained in the Channel and SIR estimation unit 9 and the info is fed to the control unit 10 that maps the SIR-estimates (per resource block) to a CQI measure that is fed to the transmit part and transmitted to the node B (not shown) that uses the CQI to adapt the modulation and coding.

A flow chart illustrating the procedure described above is shown in FIG. 4. First, in step 101, information on Doppler, channel delay spread and timing accuracy for the serving cell, i.e. the transmitter from which information is received, is obtained as described above, and based on this information the numbers $N_t$ and $N_f$ can be determined in step 102. Having determined $N_t$ and $N_f$, the channel estimate $\hat{H}_i(t)$ can be determined in step 103 according to equation (5) above.

Figure 4:
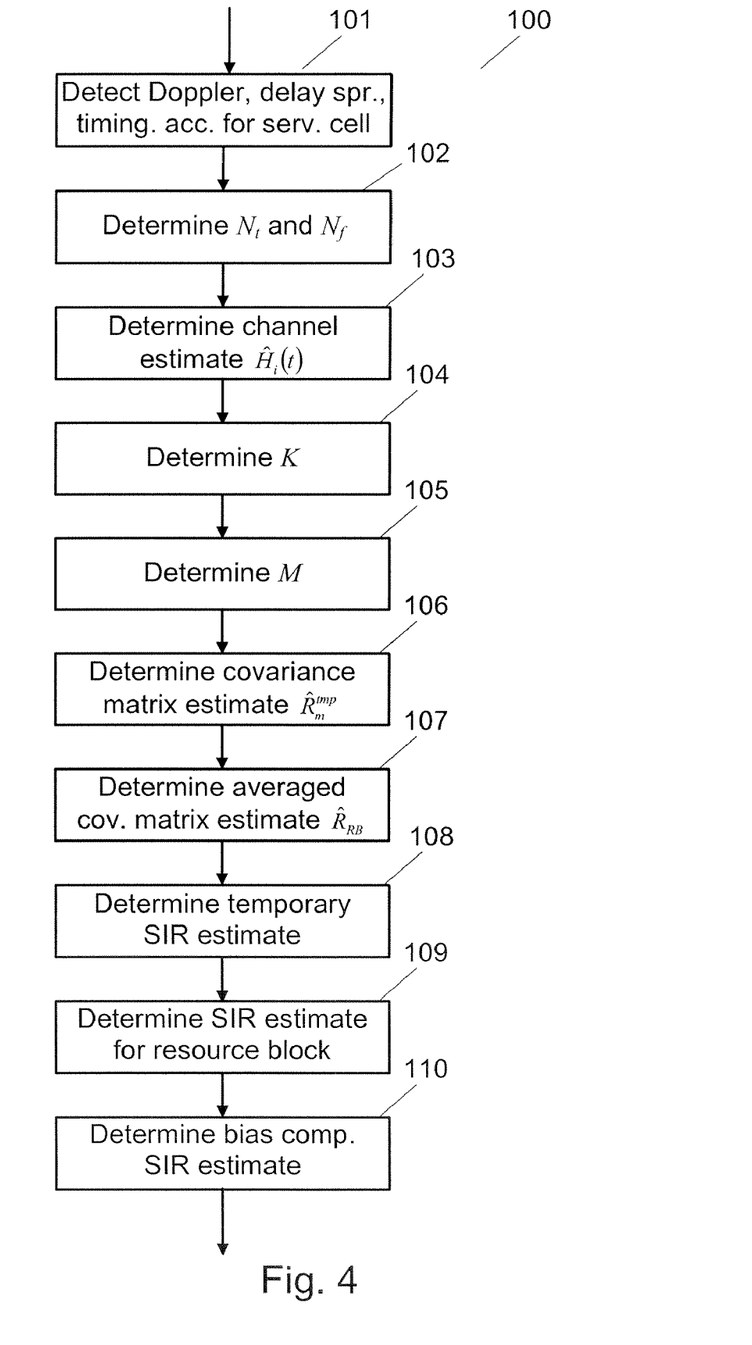
FIG. 4 shows a flow chart illustrating the steps of a method for SIR estimation.

In step 104 the number K of non-coherently combined channel estimates over one resource block is then obtained, and similarly, in step 105 the number M of resource blocks over which the covariance estimate can be averaged is determined. When the parameters $N_t$, $N_f$, K and M have been determined, the covariance matrix estimate $\hat{R}_m^{tmp}$ for one resource block can be determined in step 106 according to equation (6) above, and these estimates can then be averaged over M resource blocks in step 107 according to equation (7) above.

When the channel estimate $\hat{H}_i(t)$ has then been found for each of the K groups of pilot symbols in a resource block, and the estimate of R has been found for that resource block (and others when M>1), a temporary SIR estimate for each of the K groups of pilot symbols in the resource block can then be determined in step 108. Then the SIR estimate $\tilde{SIR}_{RB}(t)$ for the resource block is obtained as non-coherent accumulation of the K temporary SIR estimates in step 109 according to equation (8) above.

Finally, in step 110 the determined SIR estimate can be bias-compensated according to equation (9).

Although various embodiments of the present invention have been described and shown, the invention is not restricted thereto, but may also be embodied in other ways within the scope of the subject-matter defined in the following claims.

The invention claimed is:

1. A method of estimating, in a receiver of a wireless communications system, a Signal-to-Interference Ratio of a radio channel from a first transmitter to the receiver, wherein signals comprising symbols of a given duration are transmitted over said radio channel on a number of sub-carrier frequencies; and wherein pilots with reference information whose transmitted value is known to the receiver are modulated on some of said sub-carrier frequencies in some symbols, wherein the method comprises the steps of:
   detecting for received pilots at least one parameter for signals received from said first transmitter;
   defining, in dependence of said at least one parameter, first groups of pilots that can be used for coherent combining;
   determining a number of pilots in each of said first groups and a number of such first groups that can be used for non-coherent combining in a second group;

determining a channel estimate for each of said first groups of pilots from the received pilots in that group and the determined number of pilots in that group;

determining a first covariance matrix estimate for each of said second groups from the received pilots in that group, the determined channel estimate for each first group in that second group, the determined number of pilots in each first group in that second group, and the determined number of first groups in that second group;

defining in dependence of the presence of signals received from possible interfering transmitters a number of first covariance matrix estimates that can be averaged;

determining a second covariance matrix estimate as an average of said number of first covariance matrix estimates; and determining from said channel estimates and said second covariance matrix estimate a Signal-to-Interference Ratio estimate for each of said second groups.

2. A method according to claim 1, wherein the step of detecting said at least one parameter comprises detecting at least one of Doppler, time delay spread and timing accuracy for the signals received from said first transmitter.

3. A method according to claim 1 wherein the step of defining the number of first covariance matrix estimates that can be averaged comprises detecting a number of interfering transmitters and at least one of time delay spread and timing accuracy for signals received from such interfering transmitters.

4. A method according to claim 1, wherein the step of determining a Signal-to-Interference Ratio estimate for each of said second groups comprises the steps of:

determining a temporary Signal-to-Interference Ratio estimate for each first group of pilots in that second group from the determined channel estimate for that first group in the second group and the determined second covariance matrix estimate and determining the Signal-to-Interference Ratio estimate for that second group as an average of said temporary Signal-to-interference Ratio estimates determined for first groups in that second group.

5. A method according to claim 1, wherein the method further comprises the step of determining a bias-compensated Signal-to-Interference Ratio estimate by multiplying the Signal-to-Interference Ratio estimate determined for each of said second groups by a compensation factor.

6. A method according to claim 1, wherein the method is performed in a receiver of an Orthogonal Frequency Division Multiplexing system.

7. A method according to claim 6, wherein the method is performed in a receiver of a Third Generation Long Term Evolution system.

8. A method according to claim 7, wherein said second group is a resource block in said Third Generation Long Term Evolution system.

9. A method according to claim 6, characterized in that the method is performed in a receiver of a Wimax system.

10. A method according to claim 1, wherein the method further comprises the step of transmitting said determined Signal-to-Interference Ratio estimate as channel quality information to said first transmitter.

11. A receiver of a wireless communications system, wherein signals comprising symbols of a given duration are transmitted over a radio channel from a first transmitter to the receiver on a number of sub-carrier frequencies; and wherein pilots with reference information whose transmitted value is known to the receiver are modulated on some of said sub-carrier frequencies in some symbols, the receiver being arranged to estimate a Signal-to-Interference Ratio of said radio channel, wherein the receiver comprises:

means for detecting for received pilots at least one parameter for signals received from said first transmitter;

means for defining, in dependence of said at least one parameter, first groups of pilots that can be used for coherent combining, and for determining a number of pilots in each of said first groups and a number of such first groups that can be used for non-coherent combining in a second group;

means for determining a channel estimate for each of said first groups of pilots from the received pilots in that group and the determined number of pilots in that group, and for determining a first covariance matrix estimate for each of said second groups from the received pilots in that group, the determined channel estimate for each first group in that second group, the determined number of pilots in each first group in that second group, and the determined number of first groups in that second group;

means for defining in dependence of the presence of signals received from possible interfering transmitters a number of first co-variance matrix estimates that can be averaged; and means for determining a second covariance matrix estimate as an average of said number of first covariance matrix estimates, and for determining from said channel estimates and said second covariance matrix estimate a Signal-to-Interference Ratio estimate for each of said second groups.

12. A receiver according to claim 11, wherein the means for detecting said at least one parameter is arranged to detect at least one of Doppler, time delay spread and timing accuracy for the signals received from said first transmitter.

13. A receiver according to claim 11 wherein the means for defining the number (M) of first covariance matrix estimates that can be averaged is arranged to detect a number of interfering transmitters and at least one of time delay spread and timing accuracy for signals received from such interfering transmitters.

14. A receiver according to claim 11, wherein the means for determining a Signal-to-Interference Ratio estimate for each of said second groups is arranged to:

determine a temporary Signal-to-Interference Ratio estimate for each first group of pilots in that second group from the determined channel estimate for that first group in the second group and the determined second covariance matrix estimate; and determine the Signal-to-Interference Ratio estimate for that second group as an average of said temporary Signal-to-Interference Ratio estimates determined for first groups in that second group.

15. A receiver according to claim 11, wherein the means for determining a Signal-to-Interference Ratio estimate is further arranged to determine a bias-compensated Signal-to-Interference Ratio estimate by multiplying the Signal-to-Interference Ratio estimate determined for each of said second groups by a compensation factor.

16. A receiver according to claim 11, wherein the receiver is a receiver of an Orthogonal Frequency Division Multiplexing system.

17. A receiver according to claim 16, wherein the receiver is a receiver of a Third Generation Long Term Evolution system.

18. A receiver according to claim 17, wherein said second group is a resource block in said Third Generation Long Term Evolution system.

19. A receiver according to claim 16, wherein the receiver is a receiver of a Wimax system.

20. A receiver according to claim 11, wherein the receiver is further arranged to transmit said determined Signal-to-Interference Ratio estimate as channel quality information to said first transmitter.

21. A computer readable medium having stored thereon program code means for performing a method of estimating, in a receiver of a wireless communications system, a Signal-to-Interference Ratio of a radio channel from a first transmitter to the receiver when said program code means is run on a computer, wherein signals comprising symbols of a given duration are transmitted over said radio channel on a number of sub-carrier frequencies; and wherein pilots with reference information whose transmitted value is known to the receiver are modulated on some of said sub-carrier frequencies in some symbols, wherein the method comprises:

detecting for received pilots at least one parameter for signals received from said first transmitter;

defining, in dependence of said at least one parameter, first groups of pilots that can be used for coherent combining;

determining a number of pilots in each of said first groups and a number of such first groups that can be used for non-coherent combining in a second group;

determining a channel estimate for each of said first groups of pilots from the received pilots in that group and the determined number of pilots in that group;

determining a first covariance matrix estimate for each of said second groups from the received pilots in that group, the determined channel estimate for each first group in that second group, the determined number of pilots in each first group in that second group, and the determined number of first groups in that second group;

defining in dependence of the presence of signals received from possible interfering transmitters a number of first covariance matrix estimates that can be averaged;

determining a second covariance matrix estimate as an average of said number of first covariance matrix estimates; and determining from said channel estimates and said second covariance matrix estimate a Signal-to-Interference Ratio estimate for each of said second groups.

\* \* \* \* \*

UNITED STATES PATENT AND TRADEMARK OFFICE
CERTIFICATE OF CORRECTION

PATENT NO.         : 8,149,968 B2
APPLICATION NO.    : 12/675395
DATED              : April 3, 2012
INVENTOR(S)        : Lindoff It is certified that error appears in the above-identified patent and that said Letters Patent is hereby corrected as shown below:

In Column 7, Line 10, delete "$N_f$;" and insert -- $N_f$, --, therefor.

In Column 7, Line 44, delete "Mt)" and insert -- $H_j(t)$ --, therefor.

In Column 7, Line 59, delete "co-herently" and insert -- coherently --, therefor.

In Column 9, Line 33, delete "$\hat{H}_t(t)$" and insert -- $\hat{H}_i(t)$ --, therefor.

In Column 9, Line 62, delete "off" and insert -- of f --, therefor.

Signed and Sealed this
Thirteenth Day of November, 2012

David J. Kappos
*Director of the United States Patent and Trademark Office*